United States Patent
Frumusa et al.

(10) Patent No.: US 7,117,212 B2
(45) Date of Patent: Oct. 3, 2006

(54) JUST-IN-TIME (JIT) EVENT INFORMATION FOR RETAIL INDUSTRY

(75) Inventors: Lawrence P. Frumusa, Webster, NY (US); Michael Wang, Macedon, NY (US); Susan Marie Grassi, Webster, NY (US); Holly Turner, Rochester, NY (US); Qi Sun, Pittsford, NY (US); Ann Mary Davidson, Canandaigua, NY (US); Cheryl R. Jones-Richter, Victor, NY (US); Krishna Kumar, Rochester, NY (US); Scott L. Bonisteel, Brockport, NY (US); Ankoor Bodhe, Burlington, MA (US)

(73) Assignee: Xerox Corporation, Stamford, CT (US)

( * ) Notice: Subject to any disclaimer, the term of this patent is extended or adjusted under 35 U.S.C. 154(b) by 512 days.

(21) Appl. No.: 10/389,620

(22) Filed: Mar. 14, 2003

(65) Prior Publication Data

US 2004/0181535 A1 Sep. 16, 2004

(51) Int. Cl.
*G06F 17/30* (2006.01)

(52) U.S. Cl. ............ 707/10; 707/103 R; 709/206; 709/229; 713/201

(58) Field of Classification Search ............ 707/2, 707/3, 9, 10, 104.1, 200, 201, 101, 102; 709/201, 709/203, 204, 206, 229; 713/201; 726/22, 726/23

See application file for complete search history.

(56) References Cited

U.S. PATENT DOCUMENTS

| | | | |
|---|---|---|---|
| 5,428,778 A * | 6/1995 | Brookes | 707/5 |
| 5,864,871 A * | 1/1999 | Kitain et al. | 707/104.1 |
| 6,694,316 B1 * | 2/2004 | Langseth et al. | 707/10 |
| 7,017,186 B1 * | 3/2006 | Day | 726/23 |
| 2002/0087706 A1 * | 7/2002 | Ogawa | 709/229 |
| 2002/0174362 A1 * | 11/2002 | Ullmann et al. | 713/201 |
| 2003/0004965 A1 * | 1/2003 | Farmer et al. | 707/104.1 |
| 2003/0088620 A1 * | 5/2003 | Kermarrec et al. | 709/204 |
| 2004/0073615 A1 * | 4/2004 | Darling | 709/206 |
| 2004/0158565 A1 * | 8/2004 | Kakuta et al. | 707/10 |

* cited by examiner

*Primary Examiner*—Shahid Alam
(74) *Attorney, Agent, or Firm*—Fay Sharpe Fagan Minnich & McKee; Karl W. Hauber (57) ABSTRACT

An intranet online dissemination system that facilitates real time automated communication of event information to a particular user's profile. The system comprises a communication medium including a host interface for creating, categorizing, and timing the event's information. A digital repository is provided for storing the event information. Additionally, a processing module is coupled to the repository and the host interface for queuing and disseminating the event information to a user interface. An information module is provided for identifying a user and a user's profile to the system at the user interface. The processing module selectively communicates the event information via the communication medium to the user based upon the user's profile.

16 Claims, 6 Drawing Sheets

JUST-IN-TIME (JIT) EVENT INFORMATION FOR RETAIL INDUSTRY

BACKGROUND

The present invention relates to online information dissemination system, and more particularly, to a system for intranet online communication of, for example, sales events, product recalls, product promotions, customer policies, etc.

Currently in the marketplace, there typically involves an arrangement where an individual store comprises a single component in a multi-store retail chain. The individual store may be just one outlet, franchise, location, etc., representing one component of the multi-store chain. Due to the wide geographical distribution of the individual retail stores, it has been difficult to distribute time critical event information (e.g. a last minute sale for specific retail items at specific stores) in a timely fashion. Even though the event information may have been centrally available, its prompt distribution to the appropriate store personnel at the appropriate location has been extremely difficult. Conventional methods for distributing time critical event information has involved either distribution in hard copy (printing or faxing at last minute) or by word of mouth, either on the telephone or voice mail. As an example of one extreme situation, without advance notice of an event, the store personnel have to retrieve local newspapers or advertisement publications in order to ascertain what events are taking place in their respective store, (e.g. what items are on sale and at what price). When such communication is to be handled in writing, by telephone, or in person by a manager or supervisor, the time consumption and associated cost for such personal handling can present cost and servicing problems which need to be minimized. Any way that a retailer or franchiser can reduce personnel involvement in communicating, for example, sales events, product recalls, product promotions, and customer policies, is a way that can improve efficiency and service while at the same time reducing costs.

The present invention contemplates a new and improved event dissemination system and method for communicating changes in a retail sales environment whereby the appropriate store personnel receive the event information online at the appropriate location at the appropriate time. The present invention also includes the use of a communication network or communication medium. A communication network typically comprises a group of computers and associated devices that are connected by a communication facility, link, or medium. Network connections can be of a permanent nature, such as via cables, or can be of a temporary nature, such as connections made through telephone or other communication links. Networks vary in size from a point-to-point connection, to a wide area network, such as an internet network. The present invention contemplates the integration of an intranet, which involves a plurality of computers that are geographically dispersed and centrally controlled. As used in this application, the term "intranet" means a computer information system network which allows real time push of information through the system, whereby interfaces to the network are centrally controlled. The intranet network, or communication network, allows the computers connected on the network to communicate with each other while at the same time restricting access from outside of the network.

SUMMARY

In accordance with the present invention, there is disclosed a system and method for disseminating time critical event information via a common communication medium. The system comprises a host interface for creating, categorizing, and timing the event information. A digital repository is used for storing the event information. A processing module is coupled to the repository and the host interface for queuing and disseminating the event information to a user interface. An information module is used for identifying a user and a user's profile to the system at a particular interface. The processing module selectively communicates the event information via the communication medium to the user based upon a user's profile.

The present invention involves a method of disseminating the time critical event information which comprises the steps of: creating and timing the event information in a digital repository, a first categorizing of the event information based upon a store identification, selectively submitting, through a communication medium, the event information from the repository to a plurality of user interfaces, selectively communicating, in real time through the communication medium, the event information from the repository to a plurality of user interfaces, whereby the event information is selectively disseminated.

In accordance with more limited aspects of the invention, the event information is communicated to a subset of user interfaces.

Other benefits and advantages of the subject invention will become apparent to those skilled in the art upon a reading and understanding of the specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings which form a part hereof and wherein.

DETAILED DESCRIPTION

Figure 1:
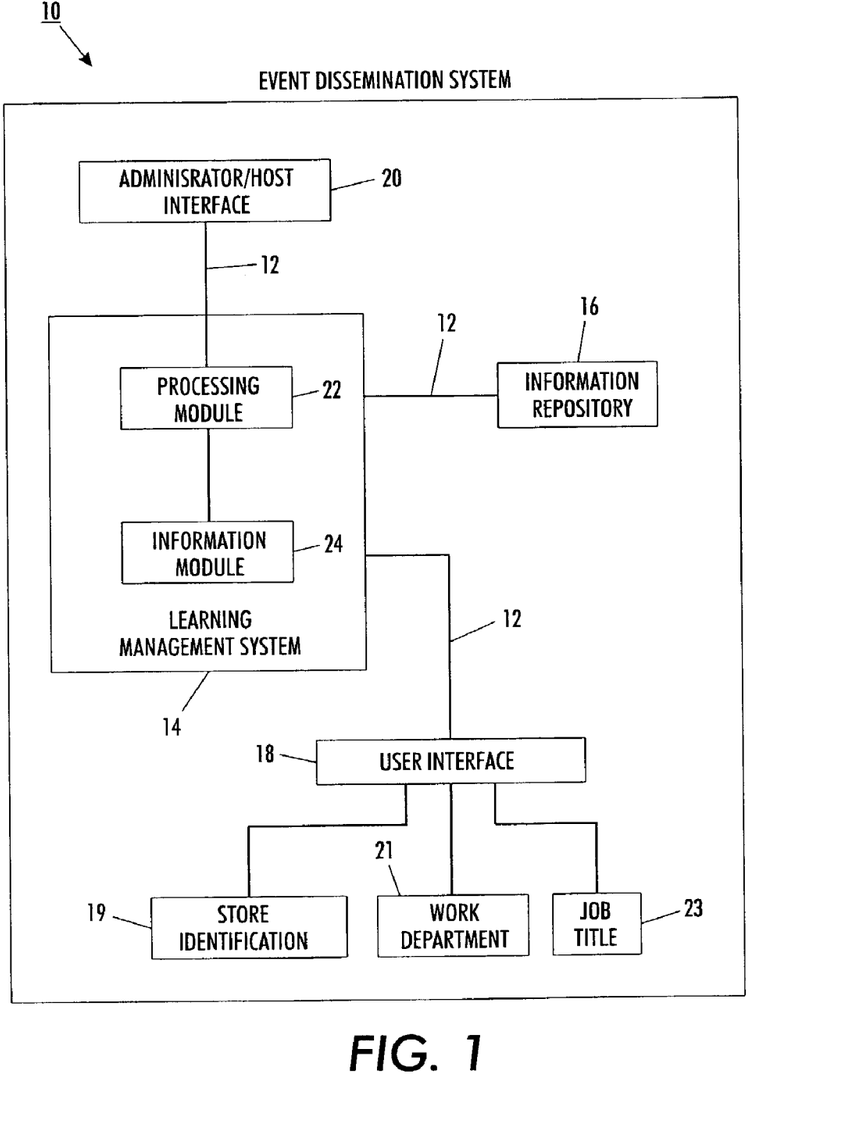
FIG. 1 is a block diagram identifying the principle processing components and interfaces of the subject invention.

As shown in FIG. 1, the subject invention is related to a dissemination system 10 for distributing time critical event information especially applicable to a retail or franchise industry, whereby a communication medium 12 or an intranet online accessing system is used for networking and communicating time critical event information. The present invention contemplates the coordination of a learning management system (LMS) 14 and a digital repository 16 in the retail environment. The LMS 14 comprises an electronic or e-learning system including a processing module 22 and an information module 24. The result is a system 10 and method that extends the functionality of the repository 16 and the LMS 14 to distribute just-in-time (JIT) event information. Although discussed with primary references to the retail industry, the invention is applicable to any other type of industry or any other group that is subject to event information. The system 10 displays the event information to a user, for example, via a graphical user interface (GUI) 18, and disseminates the information based upon the instructions from an administrator or host. The subject invention uniquely provides online viewing and updating of the event information and facilitates real time dissemination of the specific events.

The subject system 10 includes integration of several components, namely, an administrator or host interface 20, the processing module 22, the digital repository 16, the information module 24, the user interface 18, and the communication medium 12.

The present invention comprises a software based approach which contemplates an extension to the learning management system 14, whereby, for example, all corporate-wide events can be propagated to all or specific groups of employees, either automatically at log-in or on demand. In one embodiment of the present invention, the specific groups are organized by store identification 19, work department 21, or job title 23. The JIT event information approach provides for dissemination of information regarding specific events, for example, sales, recalls, customer policies, product promotions, etc. The JIT event information is initially captured at a central location in the digital repository 16 and disseminated via the processing module 22 according to programmed instructions. The approach integrates the event information with the LMS 14, enabling users to query and download the event information on demand, or the system 10 can automatically distribute the information to a specific group based upon, for example, a person's store identification 19, work department 21, and/or job title 23. The downloading of information may be automatic as a response to a person's log-on into the LMS 14 or may be downloaded on demand. This approach provides for the appropriate event or critical information to be distributed to the appropriate personnel at the appropriate time. The LMS 14 maintains confidentiality of the information and may provide restricted access, through the information module 24, based on a user's profile.

Figure 2A:
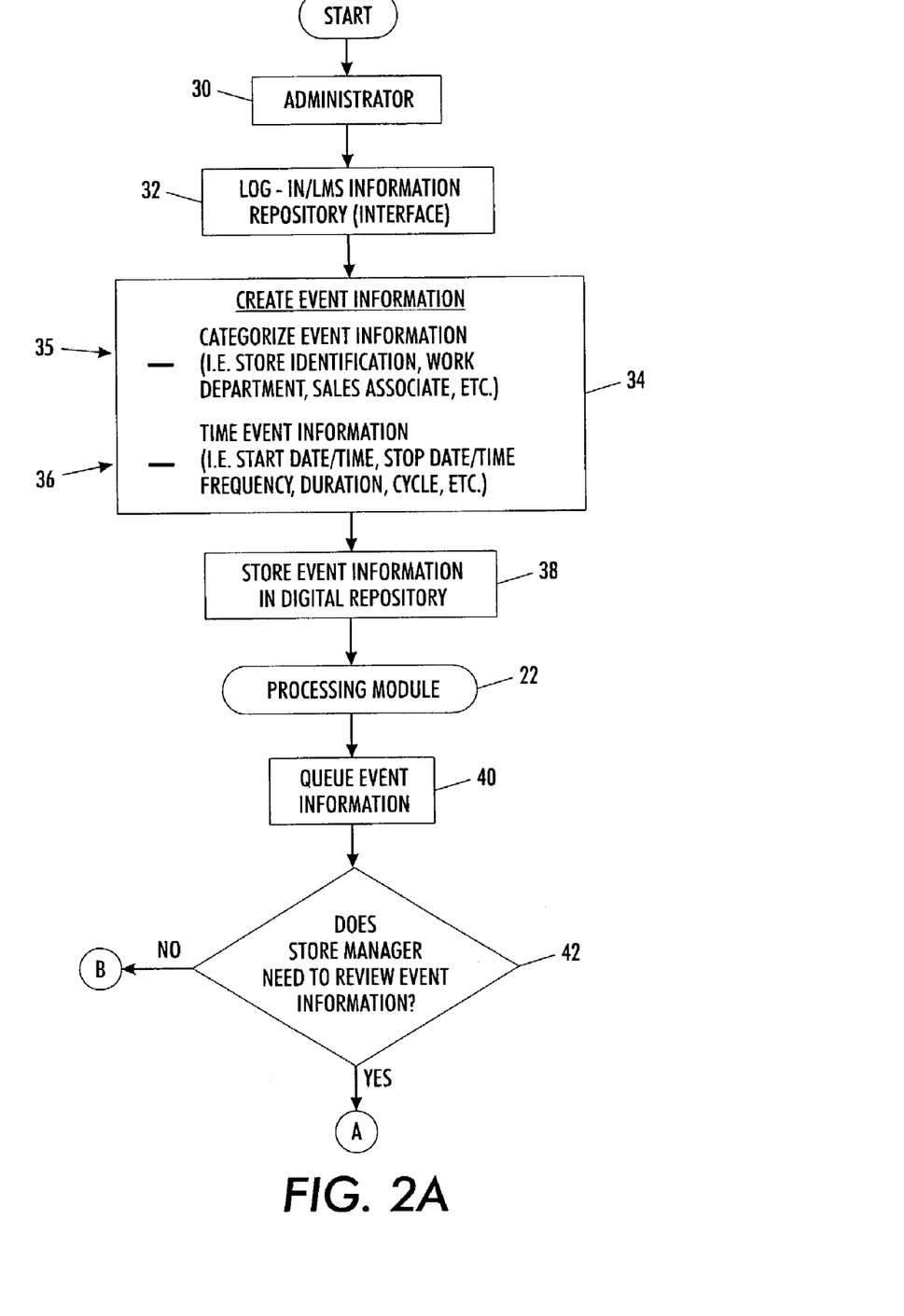
FIG. 2A–2C is a flow diagram of the steps for disseminating event information.
Figure 2B:
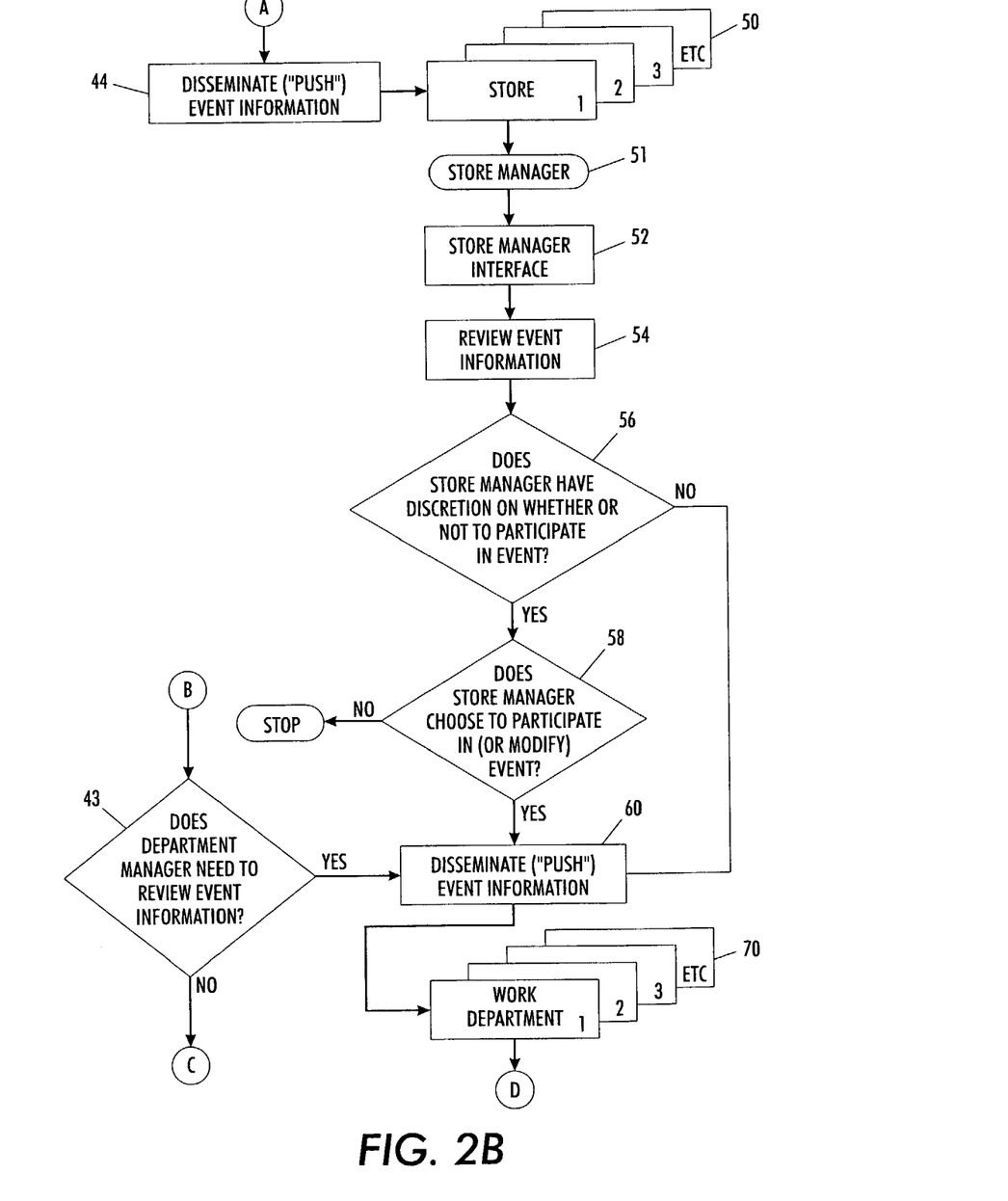
Figure 2C:
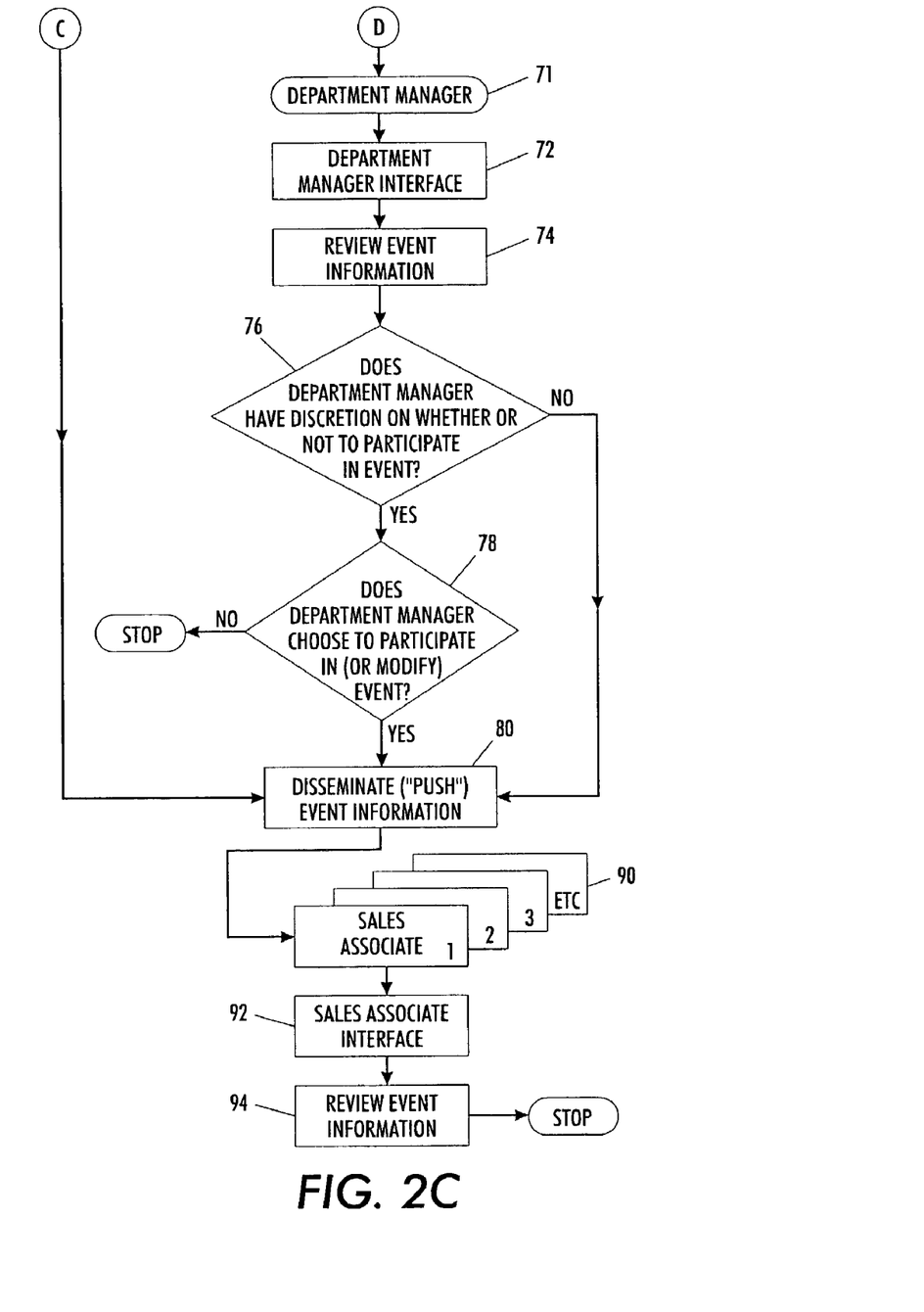

FIGS. 2A–2C represent a flow diagram illustrating the information dissemination process through the subject system 10. An administrator or host 30 can access the system 10 via an interface in order to log into 32 the LMS 14. The system 10 may query if the administrator has registered a personal security code, and after the appropriate code is entered, the administrator can enter the system (not shown). The step of inquiring and requiring a personal security code is used for maintaining the confidentiality of the system and for allowing access only to authorized individuals. The administrator 30 is the individual that has the authority to create event or event information 34 and push this information through the dissemination system 10 via the communication medium 12.

The administrator 30 will create the event information 34 comprising the parameters discussed hereinafter. Initially, the administrator 30 will determine 42, 43 whether the event information 34 needs to be disseminated (categorized) 35 at the level of store 50 or department 70. Alternatively, the administrator 30 will determine that the information 34 needs to be disseminated 44, 60, 80 to all levels 50, 70, 90 (or any combination thereof). If the event information 34 is disseminated to the store 50 via a store identification 19, the information is reviewed 54 by the store manager 51 and, using his/her discretion 56, may or may not 58 be further disseminated 60 to the work departments 70 and sales associates 90. Alternatively, the store manager 51 may elect to modify 58 the event information 34 prior to dissemination 60. Whether or not information is disseminated from the store managers 51 to the other groups may be the result of the specific store's 50 relationship with, for example, the retail chain's corporate headquarters. Specifically, an individual store 50, or retail outlet, may be independently owned and the store manager 51 may have discretion 56 on whether or not to participate 58 (or modify) in a particular event 34. If the store manager 51 has discretion 56 on whether or not to participate, the event 34 must be sent only to the store manager 51, whereby it is reviewed 54 and participation determined 58.

An event 34 typically includes several parameters as part of the event creation. The parameters listed below are illustrative of the event creation 34 and are not to be read as limiting parameters. Event parameters for a sale may include store identification, title, sale type, description, URL address, department identification, original item price, event price, and file number (see FIG. 4). Specific time event information 36 such as start date/time, stop date/time, frequency, duration, cycle period, etc., are entered at time of creation and are used by the processing module 22 and stored 38 in the event information digital repository 16. Once the event information 34 is stored 38 in the repository 16, the processing module 22 will queue 40 the event information 34 based on its category (group) 35 and timing 36. At the designated time, the processing module 22 will disseminate (push) the event information 34 to the designated group. If the store manager 51 needs to review 54 the event information 34, the information is disseminated by store identification 19. The store manager 51 logs into the LMS 14 through an interface 52. The store manager 51 may need to provide an appropriate personal security code, not shown, in order to access the system 14. Upon review 54 of the event information 34, the store manager 51 may or may not 58 further disseminate 60 the event information 34 to a work department 70. If disseminated in this manner, the event information 34 is considered to be moving downstream from the administrator 30 to the work department 70. The event information 34 at the work department 70 grouping is typically categorized based on type of merchandise in the respective work departments 70. At the department level, the department manager 71 logs into the LMS 14 via an interface 72 and reviews 74 the event information 34. Upon review 74 of the event information, the department manager 71 further disseminates 80 the event information downstream to the sales associates 90. If the department manager 71 has discretion 76 on whether or not to participate in an event, then participation must be determined 78. Alternatively, the department manager 71 may elect to modify 78 the event information 34 prior to dissemination 80.

At the sales associate level, the sales associate 90 logs into the system via an interface 92 and reviews 94 the event information pertinent to his/her job. Alternatively, as shown in FIGS. 2A–2C, the event information 34 may be moved downstream from the administrator 30 to the sales associates 90 without the intervening review of a store manager 51 and/or department manager 71.

One example of the aforementioned system contemplates the integration of the DocuShare™ digital repository. DocuShare™ is a registered trademark of The Xerox Corporation, New York, dealing with computer software for document management. DocuShare™ is an intranet-based document management system. It enables approved users, regardless of location, to dynamically store, access, and share content via a communication medium and desktop applications. It works easily with all types of documents, including text, graphics, and video. Docushare™ provides a secure repository for individual, group, or corporate (enterprise) information. All content is shielded from unauthorized users through appropriate security means. DocuShare™ allows information to move from an individual to a work group and/or to an enterprise in an upstream or downstream manner. In other words, the information is scalable from an individual to an enterprise.

Figure 3:
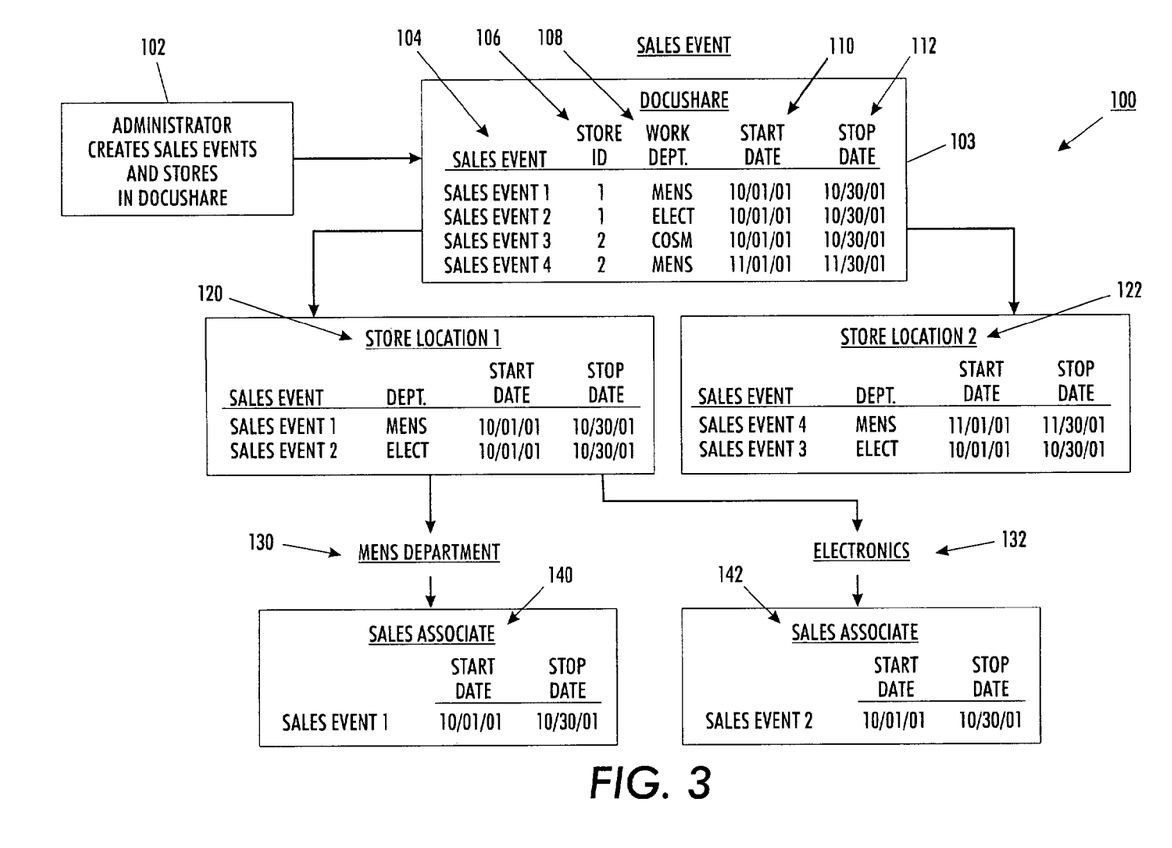
FIG. 3 is a block diagram illustrating an example of a sales event.

Referring now to FIG. 3, for illustrative purposes, an example 100 of the aforementioned system, in conjunction with the DocuShare™ information repository, is displayed showing the flow of information for a series of events 103. The first step 102 involves the administrator developing the sales events 102 and storing them in DocuShare™. As displayed, the specific sales events 104 are categorized by store identification 106 and department 108. Additionally, as shown, a start date 110 and end date 112 are attached to each event. Although not shown, additional details of the event are incorporated at the time the sales events are developed (FIG. 4) and communicated accordingly. The processing module pushes the information from the Docushare™ repository to each specific store location 120, 122. The store manager selects events for his/her particular store, and reviews. Subsequent to this review, the store manager, through the processing module, further pushes the event information to the respective work departments 130, 132. The next step involves a sales associate 140, 142 logging into the system and referencing the particular sales events related to their respective department. It will be appreciated that in this example, the information is disseminated from the store manager to the sales associates without review or intervention from a department manager.

Figure 4:
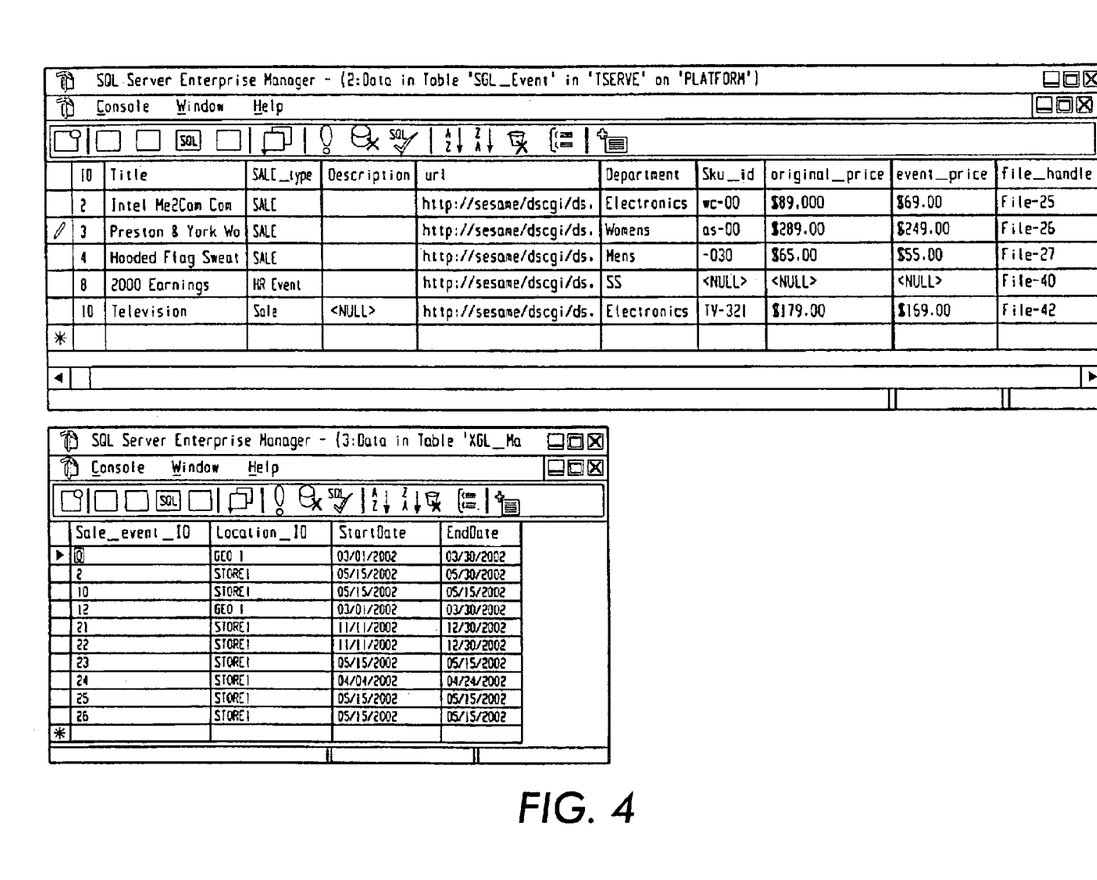
FIG. 4 is an example of screen of relational tables showing information included in an event.

FIG. 4 shows an illustrative event screen with relational tables, in which the details of several events are set forth. As illustrated, when an event and its associated meta data, URL address, is added or updated in the repository, the system through the use of DocuShare™, updates the purpose-built relational tables in the LMS database. The system utilizes the user profile in the LMS to automatically query these purpose-built LMS tables to display the events pertinent to the user when the user logs on or on demand.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents.

Having thus described the invention, it is claimed:

1. A dissemination system for distributing time critical event information via a common communications medium comprising:
   a host interface for creating, categorizing, and timing said event information wherein said event information includes a determinable frequency and a determinable discretionary dissemination;
   said timing of said event information includes a specific date and time after creation of said event information;
   a digital repository for storing said event information;
   a processing module coupled to said repository and said host interface for queuing and disseminating said event information to at least one user interface;
   an information module for identifying a user and a user's profile to the system at said at least one user interface wherein said user profile is selected from the group comprising store identification, work department, and job title and including a relationship between said host and each said user; and,
   said processing module selectively communicating said event information via said communication medium to said user based upon said user's profile and said determinable discretionary dissemination, wherein selectively communicating said event information and said determinable discretion is dependent upon said relationship between said host and said each said user and is selected from one of:
   a dissemination from said host interface to all user interfaces,
   a dissemination from said host interface to said at least one user interface and then from said at least one user interface to another user interface, and,
   a dissemination from said host interface to said at least one user interface and then discretionarily from said at least one user interface to another user interface.

2. The system as defined in claim 1, wherein said at least one user interface includes a point of sale terminal.

3. The system as defined in claim 1, further comprising disseminating said event information automatically to said user at time of user log in.

4. The system as defined in claim 1, further comprising disseminating said event information on demand by said user.

5. The system as defined in claim 1, wherein said event information is selected from the group comprising sales event, product recall, product promotion, and customer policy.

6. The system as defined in claim 1, further comprising disseminating said event information to said user in real-time.

7. The system as defined in claim 1, wherein said timing of said event information follows immediately after creation of said event information.

8. The system as defined in claim 1, wherein said event information includes a determinable duration.

9. A method of disseminating time critical digital event information comprising the steps of:
   a) creating and timing said digital event information in a digital repository at a host interface wherein said event information includes a determinable frequency and a determinable discretionary dissemination for at least a first categorizing by said host;
   b) said first categorizing of said digital event information based upon a store identification;
   c) selectively submitting through a communication medium said digital event information from said repository to a plurality of user interfaces;
   d) selectively communicating in real-time through said communication medium said digital event information and said discretionary dissemination from said repository to said plurality of user interfaces, whereby said event information is selectively queued and disseminated through a processing module coupled to said repository and a host interface wherein said selectively communicating is selected from one of a:
   a dissemination from said host interface to said plurality of user interfaces,
   a dissemination from said host interface to at least one user interface and then from said at least one user interface to another user interface, and, a dissemination from said host interface to at least one user interface and then discretionarily from said at least one user interface to another user interface; and, a second categorizing of said digital event information based upon a work department and wherein said selective communication comprises said work department.

10. The method as defined in claim 9, wherein said selective communication comprises said store identification.

11. The method as defined in claim 9, further comprising the step of a third categorizing of said digital event information based upon a job title and wherein said selective communication comprises said job title.

12. The method as defined in claim 9, wherein said first categorizing of said digital event information is further based upon a work department and said selective communication comprises said work department.

13. The method as defined in claim 12, further comprising the step of a second categorizing of said digital event information based upon a job title and wherein said selective communication comprises said job title.

14. The method as defined in claim 9, wherein said first categorizing of said digital event information is further based upon a job title and said selective communication comprises said job title.

15. The method as defined in claim 9, wherein said communication medium comprises an Intranet.

16. The method as defined in claim 9, wherein said communication medium comprises an Internet.

* * * * *